United States Patent
Chang et al.

(10) Patent No.: US 10,915,688 B2
(45) Date of Patent: Feb. 9, 2021

(54) IC LAYOUT DESIGN METHOD

(71) Applicant: REALTEK SEMICONDUCTOR CORPORATION, Hsinchu (TW)

(72) Inventors: Shu-Yu Chang, Miaoli County (TW); Shih-Jung Hsu, Hsinchu County (TW); Han-Chieh Hsieh, Hsinchu (TW); Yu-Cheng Lo, Taichung (TW); Cheng-Yu Tsai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/801,414

(22) Filed: Feb. 26, 2020

(65) Prior Publication Data
US 2020/0272783 A1    Aug. 27, 2020

(30) Foreign Application Priority Data
Feb. 27, 2019   (TW) ............................. 108106924 A

(51) Int. Cl.
*G06F 30/396*   (2020.01)
*G06F 30/398*   (2020.01)
*G06F 30/392*   (2020.01)

(52) U.S. Cl.
CPC .......... *G06F 30/396* (2020.01); *G06F 30/392* (2020.01); *G06F 30/398* (2020.01)

(58) Field of Classification Search
CPC ..... G06F 30/396; G06F 30/392; G06F 30/398
USPC ......................................... 716/110, 111, 113
See application file for complete search history.

(56) References Cited

U.S. PATENT DOCUMENTS

| | | | |
|---|---|---|---|
| 7,409,658 B2 * | 8/2008 | Shang ................... | G06F 30/392 716/119 |
| 7,739,641 B1 * | 6/2010 | Barnes ...................... | G06F 1/10 716/113 |
| 10,509,886 B2 * | 12/2019 | Lin et al. ............... | G06F 30/398 |
| 2005/0268258 A1 * | 12/2005 | Decker ................... | G06F 30/33 716/104 |
| 2015/0276871 A1 | 10/2015 | Ren et al. | |

OTHER PUBLICATIONS

OA letter of the counterpart TW application (appl. No. 108106924) dated May 21, 2020. Summary of the OA letter: Claims 1-10 are rejected as being unpatentable over the cited reference 1 (US 2015/0276871A1) in view of the common knowledge of this technical field.

* cited by examiner

*Primary Examiner* — Sun J Lin
(74) *Attorney, Agent, or Firm* — WPAT, PC

(57) ABSTRACT

Disclosed is an IC layout design method capable of improving a result of an integrated circuit (IC) layout design process including a front-end process and a back-end process. The IC layout design method includes the following steps: executing the front-end process according to an initial clock latency setting and thereby generating an initial netlist; executing at least a part of the back-end process according to the initial netlist and thereby obtaining an updated clock latency setting; executing at least a part of the front-end process according to the updated clock latency setting and thereby generating an updated netlist; and executing the back-end process according to the updated netlist and thereby obtaining the result of the IC layout design process.

19 Claims, 3 Drawing Sheets

IC LAYOUT DESIGN METHOD

BACKGROUND OF THE INVENTION

1. Field of the Invention

The present invention relates to a circuit layout design method, especially to an integrated circuit layout design method.

2. Description of Related Art

A general integrated circuit (IC) layout design process includes a synthesis process and an automatic placement and routing (APR) process. The synthesis process is used for generating a netlist of the logical gate level according to the hardware description language code (HDL code) of an IC design, and then the APR process is used for generating the physical circuit design of the IC design according to the netlist. However, the current synthesis process does not consider the clock tree from a clock root to a clock pin of a sequential cell, and thus the clock latency between the clock root and the clock pin of the sequential cell is presumed zero (e.g., the clock latency between the clock root and a flip-flop is presumed zero) or is an inaccurate default value (e.g., the clock latency between the clock root and an integrated clock gating (ICG) component or a Static Random Access Memory (SRAM) circuit is an inaccurate default value). In the above circumstances, the timing setting determined by the synthesis process could be over-constraint in order to meet the requirement for circuit operation, and thus the circuit area and power consumption of the aforementioned physical circuit design may be excessive. Since the scale of IC trends downwards, the waste of circuit area and power should be avoided, and therefore the aforementioned IC layout design process can be improved accordingly.

SUMMARY OF THE INVENTION

An object of the present invention is to provide an integrated circuit (IC) layout design method capable of improving the prior art.

An object of the present invention is to provide an IC layout design method capable of improving a result of an IC layout design process.

An embodiment of the IC layout design method can improve a result of an IC layout design process such as the consumption of circuit area and power. The IC layout design process including a front-end process and a back-end process. The embodiment includes the following steps: executing the front-end process according to an initial clock latency setting and thereby generating an initial netlist; executing a part or all of the back-end process according to the initial netlist and thereby obtaining an updated clock latency setting; executing a part or all of the front-end process according to the updated clock latency setting and thereby generating an updated netlist; and executing the back-end process according to the updated netlist and thereby obtaining the result of the IC layout design process.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this technical field. If any term is defined in the following description, such term should be interpreted accordingly.

The present disclosure discloses an integrated circuit (IC) layout design method capable of making an improvement on a result of an IC layout design process, especially on the circuit area, production cost, and leakage power of an IC (e.g., a processor). The IC layout design process includes a front-end process and a back-end process. The front-end process includes a synthesis process that can be carried out by a software tool (e.g., Design Complier of Synopsys, or Genus of Cadence); the back-end process includes an automatic placement and routing (APR) process that can be carried out by a software tool (e.g., ICC/ICC2 of Synopsys, or Innovus of Cadence). The synthesis process includes a translation step, a mapping step, and an optimization step in order; the APR process includes a placement and optimization step, a clock tree synthesis (CTS) step, a post-CTS optimization step, a signal routing step, and a post-route optimization step. The front-end process may further include one or more process(es) such as a simulation process that is carried out before the execution of the synthesis process; the back-end process may further include one or more process (es) such as a verification process that is carried out after the execution of the APR process. Since each step of the front-end process and back-end process alone is known in this technical field, its detail is omitted here.

Figure 1:
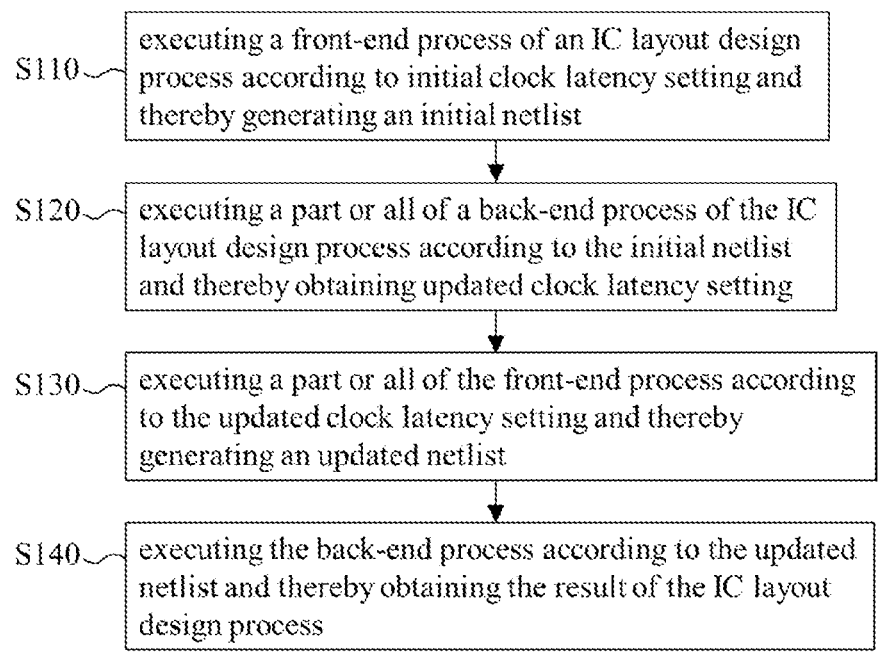
FIG. 1 shows an embodiment of the integrated circuit (IC) layout design method of the present invention.

FIG. 1 shows an embodiment of the IC layout design method of the present disclosure. This embodiment is capable of making an improvement on the result of the aforementioned IC layout design process, especially on the circuit area and power consumption. The embodiment of FIG. 1 includes the following steps:

step S110: executing the front-end process of the IC layout design process according to an initial clock latency setting and thereby generating an initial netlist. In an exemplary implementation, step S110 executes the front-end process according to the data of an initial database including the initial clock latency setting so as to generate the initial netlist, and then step S110 updates the initial database after the execution of the front-end process to obtain a first updated database (i.e., the updated initial database). In an exemplary implementation, step S110 executes the front-end process including the aforementioned synthesis process to generate the initial netlist. In an exemplary implementation, the clock latency between a clock root and a clock pin of a sequential cell is equal to a first value in accordance with the initial clock latency setting; for instance, the first value is zero. In an exemplary implementation, the sequential cell is one of the following: a flip-flop; an integrated clock gating (ICG) component; a Static Random Access Memory (SRAM) circuit; and a logical circuit (e.g., a counter or a latch) capable of retaining data.

step S120: executing a part or all of the back-end process of the IC layout design process according to the initial netlist and thereby obtaining an updated clock latency setting. In an exemplary implementation, step S120 executes a part of all of the aforementioned APR process (e.g., the placement and optimization step, the CTS step, and the post-CTS optimization step as indicated by steps S222~S226 of FIG. 2; or the placement and optimization step, the CTS step, the post-CTS optimization step, the signal routing step, and the post-route optimization step as indicated by steps S322~S329 of FIG. 3) and thereby obtains the updated clock latency setting. In an exemplary implementation, the clock latency between the aforementioned clock root and the aforementioned clock pin of the sequential cell is equal to a second value in accordance with the updated clock latency setting, wherein the second value is different from the aforementioned first value; for instance, the second value is greater than the first value.

step S130: executing a part or all of the front-end process according to the updated clock latency setting and thereby generating an updated netlist. In an exemplary implementation, step S130 updates the aforementioned first updated database according to the updated clock latency setting so as to obtain a second updated database (i.e., the updated first updated database), and then step S130 executes the part or all of the front-end process according to the second updated database to generate the updated netlist. In an exemplary implementation, step S130 executes at least a part of the aforementioned synthesis process (e.g., the optimization step as indicated by step S236 of FIG. 2 or step S336 of FIG. 3; or the mapping step and the optimization step) according to the updated clock latency setting and thereby generates the updated netlist.

step S140: executing the back-end process according to the updated netlist and thereby obtaining the result of the IC layout design process.

It should be noted that steps S110~S140 could be executed by one software tool or multiple software tools. It should also be noted that the aforementioned database could be automatically updated by a software tool or manually updated by user inputs.

Figure 2:
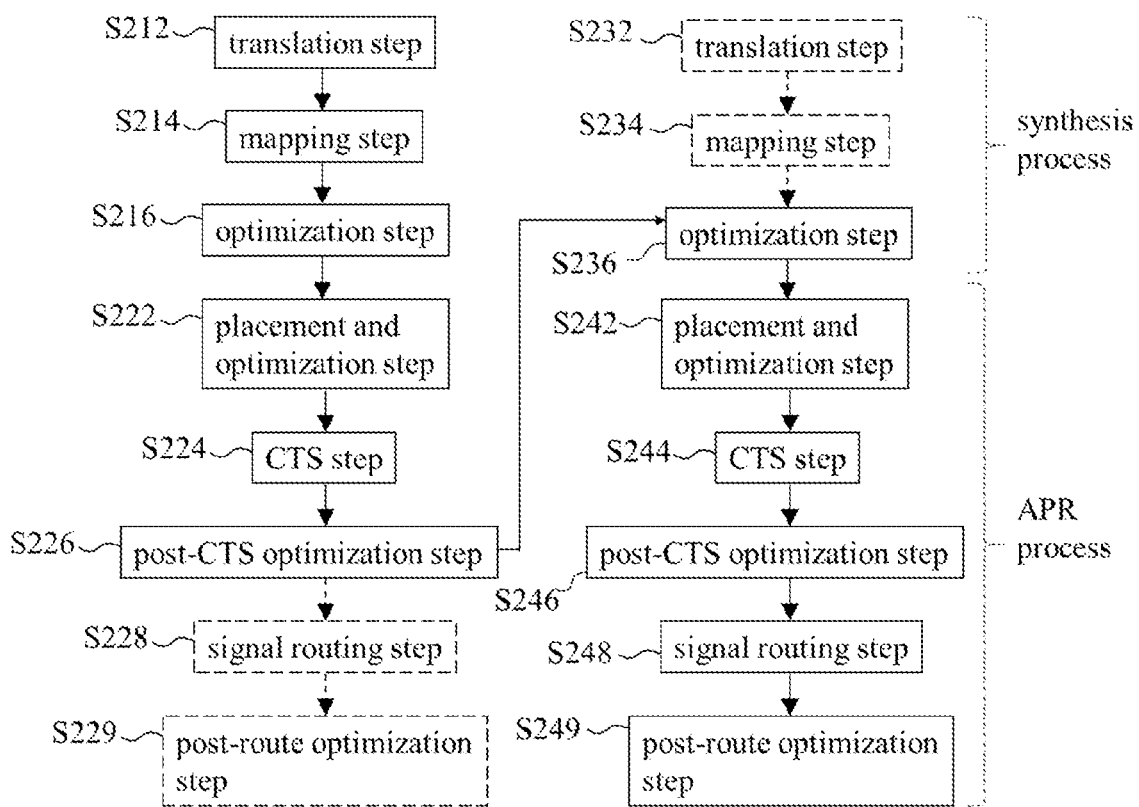
FIG. 2 shows an exemplary implementation of the embodiment of FIG. 1.

FIG. 2 shows an exemplary process of the IC layout design method of FIG. 1, in which the steps with dashed lines (i.e., the signal routing step S228, the post-route optimization step S229, the translation step S232, and the mapping step S234) are skipped (i.e., not executed) here. As shown in FIG. 2, the exemplary process includes the following steps to be executed: the translation step S212, mapping step S214, and optimization step S216 of the aforementioned synthesis process; the placement and optimization step S222, CTS step S224, and post-CTS optimization step S226 of the aforementioned APR process; the optimization step S236 of the synthesis process; and the placement and optimization step S242, CTS step S244, post-CTS optimization step S246, signal routing step S248, and post-route optimization step S249 of the APR process. In the exemplary process of FIG. 2, the updated clock latency setting is determined after the execution of the post-CTS optimization step S226; since this process jumps to the optimization step S236 of the front-end process right after the execution of the post-CTS optimization step S226 of the back-end process, this process can save the method the time for executing the steps following the post-CTS optimization step S226 (i.e., the steps with dashed lines of FIG. 2).

Figure 3:
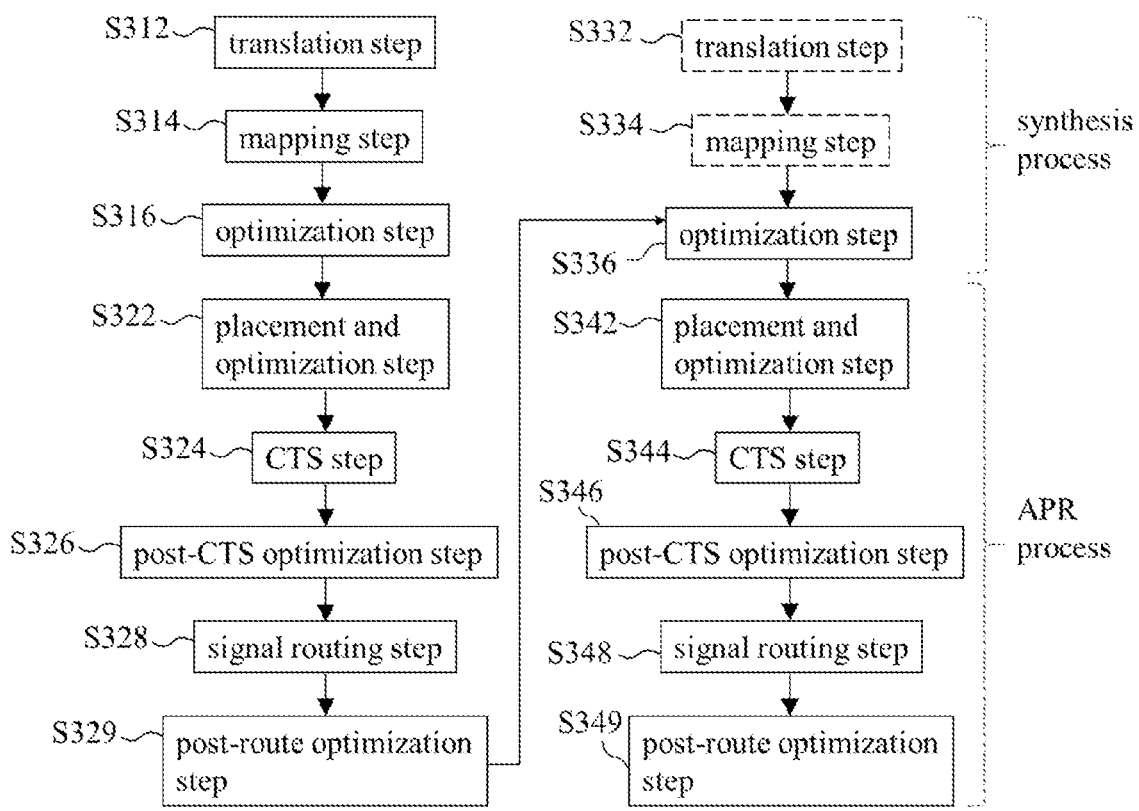
FIG. 3 shows another exemplary implementation of the embodiment of FIG. 1.

FIG. 3 shows another exemplary process of the IC layout design method of FIG. 1, in which the steps with dashed lines (i.e., the translation step S332 and the mapping step S334) are skipped (i.e., not executed) here. As shown in FIG. 3, the exemplary process includes the following steps to be executed: the translation step S312, mapping step S314, and optimization step S316 of the synthesis process; the placement and optimization step S322, CTS step S324, post-CTS optimization step S326, signal routing step S328, and post-route optimization step S329 of the APR process; the optimization step S336 of the synthesis process; and the placement and optimization step S342, CTS step S344, post-CTS optimization step S346, signal routing step S348, and post-route optimization step S349 of the APR process. In the exemplary process of FIG. 3, the updated clock latency setting is determined after the execution of the post-route optimization step S329; since this process jumps to the optimization step S336 after the execution of the post-route optimization step S329, the updated clock latency setting of this process is more accurate than that of the exemplary process of FIG. 2, and thus the process of FIG. 3 can further improve the result of the IC layout design process.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the IC layout design method of the present disclosure can improve a result of an IC layout design process such as the consumption of circuit area and power. Accordingly, the IC layout design method of the present disclosure can lower the IC production cost and reduce the IC leakage power.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method for improving an integrated circuit (IC) layout design process that includes a front-end process and a back-end process, the method comprising:
   executing the front-end process according to an initial clock latency setting and thereby generating an initial netlist;
   executing a part or all of the back-end process according to the initial netlist and thereby obtaining an updated clock latency setting;
   executing a part or all of the front-end process according to the updated clock latency setting and thereby generating an updated netlist; and
   executing the back-end process according to the updated netlist and thereby obtaining a result of the IC layout design process.

2. The method of claim 1, wherein the front-end process includes a synthesis process and the back-end process includes an automatic placement and routing (APR) process.

3. The method of claim 2, wherein the part of the front-end process includes an optimization step of the synthesis process.

4. The method of claim 3, wherein the method executes the part of the front-end process according to the updated clock latency setting and thereby generates the updated netlist.

5. The method of claim 3, wherein the APR process includes a post-clock-tree-synthesis (post-CTS) optimization step and a post-route optimization step, and the part or all of the back-end process includes the post-CTS optimization step.

6. The method of claim 5, wherein the updated clock latency setting is determined after execution of the post-CTS optimization step.

7. The method of claim 5, wherein the method executes the part of the back-end process according to the initial netlist and thereby obtains the updated clock latency setting.

8. The method of claim 7, wherein the part of the back-end process does not include the post-route optimization step and one or more subsequent step(s) thereof.

9. The method of claim 5, wherein the all of the back-end process includes the post-route optimization step.

10. The method of claim 9, wherein the updated clock latency stetting is determined after execution of the post-route optimization step.

11. The method of claim 2, wherein the APR process includes a post-clock-tree-synthesis (post-CTS) optimization step and a post-route optimization step, and the part or all of the back-end process includes the post-CTS optimization step.

12. The method of claim 11, wherein the updated clock latency setting is determined after execution of the post-CTS optimization step.

13. The method of claim 11, wherein the method executes the part of the back-end process according to the initial netlist and thereby obtaining the updated clock latency setting.

14. The method of claim 13, wherein the part of the back-end process does not include the post-route optimization step.

15. The method of claim 11, wherein the part of the back-end process includes the post-route optimization step.

16. The method of claim 15, wherein the updated clock latency setting is determined after execution of the post-route optimization step.

17. The method of claim 1, wherein a clock latency between a clock root and a clock pin of a sequential cell is equal to a first value according to the initial clock latency setting; the clock latency between the clock root and the clock pin of the sequential cell is equal to a second value according to the updated clock latency setting; and the second value is different from the first value.

18. The method of claim 17, wherein the first value is zero and the second value is greater than zero.

19. The method of claim 17, wherein the sequential cell is one of: a flip-flop, an integrated clock gating (ICG) component, a Static Random Access Memory (SRAM) circuit, and a logical circuit capable of retaining data.

* * * * *